(12) United States Patent
Schramm

(10) Patent No.: US 7,926,693 B2
(45) Date of Patent: Apr. 19, 2011

(54) CENTERING PIN WITH A WEAR-RESISTANT SINTERED BODY AND METAL TIP

(75) Inventor: Peter Schramm, Naila (DE)

(73) Assignee: Friatec Aktiengesellschaft, Mannheim (DE)

( * ) Notice: Subject to any disclaimer, the term of this patent is extended or adjusted under 35 U.S.C. 154(b) by 0 days.

(21) Appl. No.: 12/839,951

(22) Filed: Jul. 20, 2010

(65) Prior Publication Data
US 2010/0284766 A1 Nov. 11, 2010

Related U.S. Application Data

(63) Continuation of application No. 10/593,988, filed on Jan. 24, 2007, now abandoned.

(51) Int. Cl.
*B23K 37/00* (2006.01)
*B23K 1/00* (2006.01)
*B23Q 1/00* (2006.01)
*F16B 43/02* (2006.01)
*B21J 13/08* (2006.01)

(52) U.S. Cl. ......... 228/4.1; 228/44.3; 228/47.1; 228/57; 269/53; 411/531; 411/900; 219/158

(58) Field of Classification Search ........ 228/44.3–49.6, 228/212–213; 219/121.58, 158, 161, 521, 219/647, 659, 774, 777; 411/531, 493, 90, 411/901, 904
See application file for complete search history.

(56) References Cited

FOREIGN PATENT DOCUMENTS

| DE | 10222008 | 12/2003 |
|----|----------|---------|
| JP | 02-290696 | 11/1990 |
| JP | 11-280721 | 10/1999 |
| WO | WO-2004/069468 | 8/2004 |

*Primary Examiner* — Kiley Stoner
*Assistant Examiner* — Carlos Gamino
(74) *Attorney, Agent, or Firm* — Jordan & Hamburg LLP

(57) ABSTRACT

A receiving element which can be introduced into a borehole of at least one component includes a bolt presenting an outer surface that is approximately parallel and advantageously coaxial to a longitudinal axis of the bolt. The receiving element requires few materials and can therefore be produced at a low constructional cost while being provided with high dimensional stability and positioning accuracy. The bold includes an abrasion-resistant sintered material, and a metal tip provided on the front end of the shaft. The end part of the tip is engageable in a recess of the bolt, and there is a direct connection between the end part and the recess in the connection region on the front end of the bolt.

24 Claims, 1 Drawing Sheet

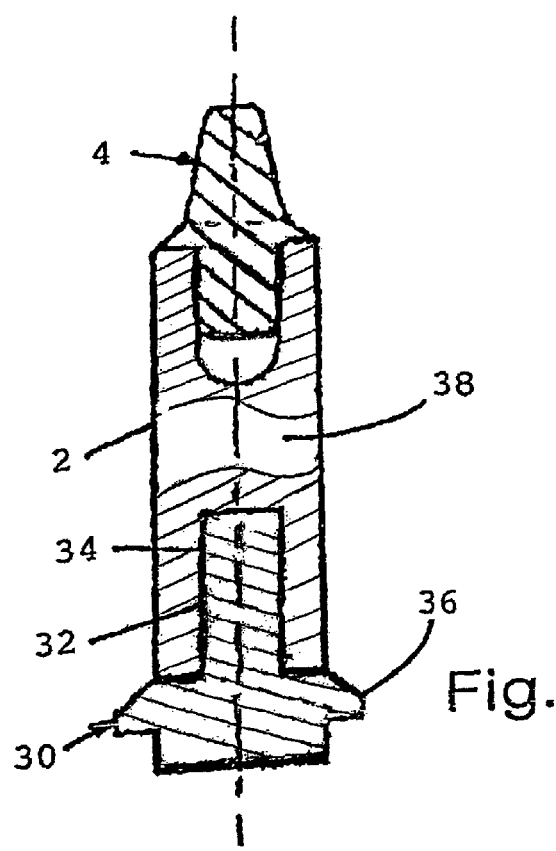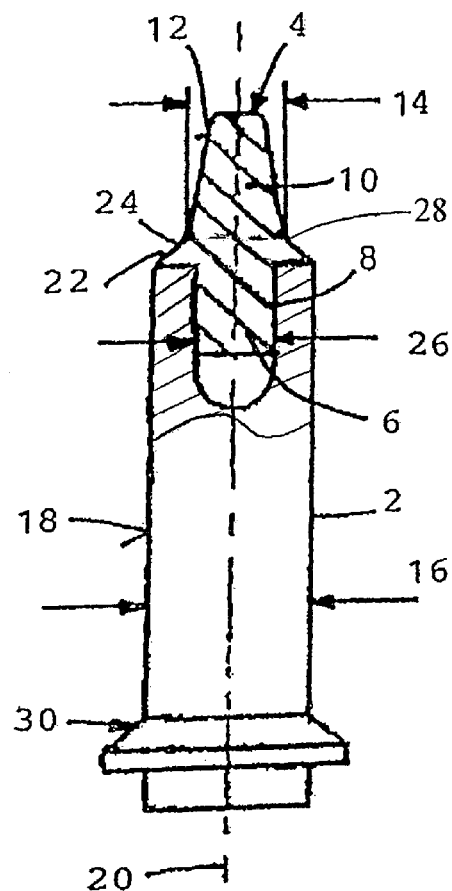
Fig. 1
Fig. 2

CENTERING PIN WITH A WEAR-RESISTANT SINTERED BODY AND METAL TIP

REFERENCE TO RELATED APPLICATION

This is a continuation application of Ser. No. 10/593,988, filed Jan. 24, 2007 now abandoned which is currently pending. The subject matter of the aforementioned prior application is hereby incorporated herein by reference.

BACKGROUND OF THE INVENTION

The invention relates to a receiving element useful, for example, as a centering pin or receiving pin for centering and receiving components, in particular a plurality of metal sheet parts or at least one metal sheet part having a threaded female element, and more particularly employable in association with welding tools, in particular pressure welding tools, apparatus or machines.

A receiving element is disclosed in WO 2004/069 468 A1, having a bolt that, in the area of its external surface, which is largely parallel to a longitudinal axis, includes at least two recesses with apertures. Arranged in these recesses are pins that comprise or contain wear-resistant material and that extend somewhat radially through said apertures and project over the external surface with a predefined overhang. Such receiving elements can be introduced into bores of at least one component for fixing and/or aligning for subsequent machining. For instance, if two metal sheets are to be joined to one another by welding, these contain receiving bores that match one another and into which a receiving element of the type cited is subsequently introduced for centering and receiving the metal sheets. Particularly in the case of large components, a plurality of such receiving elements are usefully provided as production or assembly aids. The receiving elements can also be employed as holding pins and/or guide pins in machines, systems, or machining systems for components, these being for instance automatic welding machines, punches, or presses. Production of these previously known receiving elements requires a certain complexity because first the at least two lateral apertures must be added to the bolt, which normally comprises metal, and then the at least two pins, which comprise or contain sintered material, must be introduced into the apertures, whereby in a useful manner in a further machining step, the pins projecting outward from the bolt are machined such that the surface areas of the pins that overhang farthest radially are located on a common surface. Even without performing this latter method step, adding at least two apertures to the bolt and preparing and inserting the two aforesaid pins entails production complexity that is not insubstantial.

Moreover, a receiving element is disclosed in JP 02 290 696 A that has a sleeve comprising a sintered material, through which a bolt, provided with a tip, passes. The end of the bolt facing away from the tip is provided with a thread that engages in a threaded bore of an element provided with a male thread, the aforementioned sleeve being clamped axially between the bolt tip and the element. The production of the cylindrical sleeve made of sintered material is quite complex in order to avoid radial play in terms of the bolt that passes through and conversely to avoid undesired radial compression and associated waste during production. In addition, this receiving element also comprises at least three parts, specifically sleeve and bolt and the threaded element that has a male thread, and thus the various machining steps being disadvantageous especially during serial production of large numbers of units.

Based upon the foregoing, the underlying object of the invention is to further develop a receiving element with less structural complexity while avoiding the aforesaid disadvantages such that high dimensional stability and positioning accuracy are assured for a long service life. The production of the receiving element should not require great complexity and/or material consumption, and should be economical to implement. Moreover, it should be possible without significant problem to assure the electrical insulation that is used when the receiving element is used or employed for producing a weld joint, in particular for metal sheet parts and/or one metal sheet part with threaded female elements. Furthermore, the receiving elements should especially be used in welding systems or devices, for example, for producing pressure welded joints.

SUMMARY OF THE INVENTION

The receiving element in accordance with the invention is characterized by a simple and functionally appropriate structure. The bolt comprises wear-resistant sintered materials, preferably oxide ceramics or non-oxide ceramics, for example, $Al_2O_3$, $ZrO_2$, or $Si_3N_4$, or mixtures thereof, and contains at a forward end thereof a recess in which a tip, comprising metal, advantageously, for example, steel or high-grade steel, engages and is attached at one end section. In the interior of the bolt, a direct or immediate connection is provided between the tip, via an end section thereof, and the recess, advantageously embodied, for example, as a blind hole, provided in the bolt. The recess, which is preferably coaxial with the longitudinal axis and/or penetrated thereby, permits a lasting and loadable connection in the comparatively short axially forward area of the bolt without a reduction in the cross-section of the bolt, whish is made of the high-performance ceramics or sintered material used, being necessary over the entire axial length. The interiorly situated forward connecting area extends only over a fraction (portion) of the entire length of the bolt, advantageously less than 50%, and more preferably less than 30% thereof. The end section of the tip and/or the forward connecting area possesses an axial length that is substantially smaller than the total length of the bolt. Furthermore, it is particularly important that the interiorly situated connecting area is reliably protected from attack by an environmental medium, for example, steam or aggressive gases. The fastening of the tip or its end section in the axial recess of the bolt is advantageously embodied as an adhesive joint, shrink fit, press fit or clamp connection. Mechanical processing, for example, circular grinding, is used to grind the exterior surface of the bolt embodied from sintered material and/or high-performance ceramics to the required aperture diameter for the component to be processed, in particular metal sheet or threaded female element.

In contrast to receiving elements with tips made of ceramics, which can break off relatively easily, particularly when they have small diameters, using the metal tip prevents the extremely disadvantageous breakage with a high degree of functional assuredness. Thus components encountered in connection with the invention, in particular metal sheets, can be readily joined to one another using the suggested receiving elements, in particular in welding tools and/or pressure welding tools, even with threaded female elements that are quite small, in particular with M4, M5, M6, or M8 female threads, avoiding failure times and idle times for the welding tools or automatic welding systems and attaining long useful life periods. The bolt is advantageously produced, for example, by dry pressing, extrusion, or in an injection molding process and/or by mechanical processing. The bolt is advantageously embodied as a part, either as tube or bar, and is provided and/or fitted with the metal tip at the forward free end.

Moreover, in particular for optimizing the insulation, a fastening body made of an insulating material, advantageously, for example, plastic, can be provided at the other end of the bolt from the tip, an adhesive joint, shrink fit, press fit, or clamp connection preferably being provided. By using high-performance ceramics for the bolt in conjunction with the tip made of metal, advantageously steel, and optionally arranging the fastening body made of insulating material at the other end, the inventive receiving element is characterized primarily by the following improved properties: specifically, high wear-resistance and/or extremely long service life and/or good dimensional stability and/or precise positioning accuracy and/or high surface quality and/or optimized electrical insulation.

The invention is explained in greater detail in the following using the exemplary embodiments depicted in the drawings, without this resulting in any limitation.

BRIEF DESCRIPTION OF THE DRAWINGS

FIG. 1 is a schematic depiction of an axial section of a first exemplary embodiment according to the invention; and FIG. 2 is an axial section of another exemplary embodiment according to the invention having a fastening body made of an insulating material for additional insulation.

DETAILED DESCRIPTION OF THE INVENTION

In accordance with FIG. 1, a receiving element comprises a bolt 2, and a tip 4 that is produced as a separate component having an end section 6 which engages in a recess 8 of the bolt 2 at a forward end of the latter. The bolt 2 comprises or contains wear-resistant sintered material, preferably oxide ceramics, such as, for example, $Al_2O_3$ or $ZrO_2$, or non-oxide ceramics such as $Si_3N_4$, or mixtures thereof. The forward section 10 of the tip 4 projects axially out of the bolt 2 and presents an exterior surface 12 that is at least approximately and/or largely conical. In the exit area from the bolt 2, the tip 4 or the forward section 10 thereof includes a maximum external diameter 14 that is smaller by a prescribed amount than the external diameter 16 of the bolt 2 or the exterior surface 18 thereof. The recess 8 in the forward end of the bolt 2 is preferably embodied as a blind hole, and the end section 6 extends axially over only a fraction of the entire length of the bolt 2.

The exterior surface 18 runs largely parallel to the longitudinal axis 20 of the bolt or the entire receiving element and is advantageously embodied as a cylindrical exterior surface that is coaxial with the longitudinal axis 20. Alternatively, the exterior surface 18 can have a polygonal exterior contour. As can be seen, a transition area 22 that tapers toward the end section 6 is present between the forward, advantageously conical, end section 6 and the exterior surface 18 of the bolt 2. While the transition area 22 is optionally a component of the bolt 2, the transition area 22 can alternatively also be a component of the tip 4. The receiving element includes a stepped exterior contour with the forward section 10 of the tip 4 projecting out of the bolt 2, the maximum external diameter 14 being substantially smaller than the external diameter 16 of the bolt. The transition area 22 presents a substantially smaller axial extension than the end section 6. Moreover, the takeout angle or cone angle of the transition area 22 is preferably substantially larger than the takeout angle or cone angle of the end section 6.

Due to the substantially smaller external diameter 14 of the forward section 10 relative to the external diameter 16 of the bolt 2 and/or due to the transition area 22 according to the invention, certain introduction of the receiving element into an associated bore of the components to be centered by virtue of the receiving element, especially metal sheet and threaded female element, is assured. The tip 4 comprises metal, advantageously steel or high-quality steel, so that, even when the external diameters of the receiving element and the bolt 2 are quite small, the tip 4 will not be damaged or broken off and/or a long service life or useful life is attained for the receiving element.

In a particularly advantageous embodiment, the direct connection of the tip 4 or the end section 6 thereof in the correspondingly embodied recess 8 is provided as an adhesive joint, shrink fit, press fit, or clamp connection. The recess 8 is advantageously coaxial with the longitudinal axis 20. For precise axial positioning of the tip 4 in the bolt 2, a step 24 is present between the axially projecting forward section 4 and the end section 6 arranged in the recess 8 so as to define a transition area transition point 28, such that the maximum external diameter 14 of the forward section 10 is larger by a prescribed amount than the external diameter 26 of the end section 6. The step 24 thus forms a defined stop, in particular during insertion and/or when producing the connection between the bolt 2 and the tip 4, which provides exact axial positioning and ultimately a defined axial length of the entire receiving element. Moreover, impermissibly high loading or even destruction of the connection between the tip 4 and the bolt 2 is avoided by virtue of the step 24.

The bolt 2 contains a fastening body 30 at an end facing away from the tip 4 for placing the receiving element in a tool, for example, a pressure welding tool. The fastening body 30 contains a flange, advantageously embodied as a radial extension for placement in the tool. As noted above, the receiving element is preferably embodied as a centering pin or receiving pin, and is used for centering and receiving components, in particular a plurality of metal sheet parts or at least one metal sheet part having a threaded female element. Furthermore, the receiving element is provided primarily for employment and/or use in welding tools, in particular pressure welding tools or apparatus or machines. Moreover, the inventive receiving element is characterized by relatively small external dimensions. Thus, the external diameter 16 of the bolt 2 is largely in the range of 3 to 12 mm, preferably 3.5 to 10 mm, and in particular from 4 to 8.5 mm. Thus, when using the inventive receiving element, even very small threaded female elements having internal diameters of M4 or M5 or M6 or M8 threads can be centered by means of the receiving element or received thereby and in associated machines or tools, such as, for example, pressure welding machines, can be joined to metal sheet parts, whereby even with such small radial dimensions, the tip is prevented with certainty from breaking off due to the suggested embodiment of the metal tip 4 and its integration into the bolt 2 made of high-performance ceramics and/or wear-resistant sintered material and ultimately high functional security and/or service life is attained.

FIG. 2 illustrates another exemplary embodiment, according to which the fastening body 30 is not an integral component of the bolt 2 but rather is joined to the bolt 2 as a separate component. The fastening body 30 comprises a special insulating material, for example, plastic, in order to assure additional and/or improved insulation of the receiving element with respect to the tool, in particular a pressure welding tool. As can be seen, at a back end, the bolt 2 contains a second recess 32 in which a connecting section 34 of the fastening section 30 engages. The connecting section 34 is joined in the second recess 32 by an adhesive joint, shrink fit, press fit or clamp connection. Furthermore, the fastening body contains a radial expansion and/or a flange 36, the external diameter of which is greater than the external diameter of the bolt 2. A step is present between the connecting section 34 and the flange 36, which serves to provide defined placement and/or axial alignment of the fastening body 30 with respect to the bolt 2. As in the exemplary embodiment in accordance with FIG. 1, between the two recesses 8 and 32 the bolt 2 contains a massive intermediate area 38 that assures high stability and/or strength of the bolt 2 and thus of the entire receiving element.

Alternatively, in the framework of the invention, the bolt 2 can have a single central recess that extends across the entire axial length. If, corresponding to FIG. 2, a separate fastening body 30 is provided at the back end, however, there is no immediate axial connection between the tip 4 arranged at the forward end and the fastening body 30 and consequently axial connecting forces between the tip 4 and the fastening body 30 are avoided in an advantageous manner. It is hereby also further stated that an interiorly situated recess can extend axially through the entire length of the bolt, including the integrally formed connecting body thereof, as well, alternatively to the embodiment in accordance with FIG. 1. However, the connecting area in such an embodiment is provided solely on the forward end of the bolt 2.

LEGEND

2 Bolt
4 Tip
6 End section of 4
8 Recess in 2
10 Forward section of 4
12 Exterior surface of 6
14 Maximum external diameter of 6
16 External diameter of 2
18 Exterior surface of 2
20 Longitudinal axis
22 Transition area
24 Step between 4 and 6
26 External diameter of 6
28 Transition area transition point
30 Fastening body
32 Second recess in 2
34 Connecting section of 30
36 Flange of 30
38 Massive intermediate area of 2

The invention claimed is:

1. A receiving element, comprising:
a bolt having an exterior surface that is substantially parallel to a longitudinal axis of said bolt and that can be introduced into a bore in at least one component, said bolt consisting of wear-resistant sintered material and including an axial recess at a forward terminal end of said bolt,
said recess comprising a midpoint positioned along said longitudinal axis and defining a recess bottom, said recess being positioned in a connecting area of said bolt that is provided at a forward end of said bolt,
the connecting area extending along a portion of an entire length of said bolt that is less than the entire length of said bolt; and
a tip comprised of metal that is arranged within said connecting area of said bolt, said tip including a cylindrical end section which engages in said recess and a forward section which comprise a one-piece construction, said tip defining a longitudinal axis being collinear with said longitudinal axis of said bolt and a longitudinal axis of said recess, and further including
a transition area between said forward section of said tip and said cylindrical end section of said tip that defines a first transition area diameter and a transition area transition point, said transition area comprising a tapered surface area and a contact surface in contact with a terminal end surface of said forward terminal end of said bolt and said tapered surface tapering from a plane containing said contact surface of said tip to said forward section of said tip,
said tapered surface defining said first transition area diameter so that said receiving element includes a stepped exterior contour extending linearly in cross section from said plane to said transition area transition point,
said forward section of said tip having a maximum external diameter that is less than the external diameter of said bolt and greater than the external diameter of said cylindrical end section of said tip by a prescribed amount,
said taper of said transition area providing a transition area surface area that, as a result of said taper, increases in dimension from said transition area transition point to said contact surface of said tip that contacts said terminal end surface of said forward terminal end of said bolt so that said tip is engaged against said terminal end surface of said forward terminal end of said bolt and an outer periphery of said transition area aligns with an outer periphery of said terminal end surface of said forward terminal end of said bolt and said tip extends substantially continuously with said exterior surface of said bolt, said taper defining the exterior contour of said receiving element between said plane containing said contact surface of said tip that contacts said terminal end surface of said forward terminal end of said bolt and said forward section of said tip, and said forward section of said tip extending from said transition area so as to project therefrom and axially out of said bolt.

2. A receiving element according to claim 1, wherein said at least one component includes at least two components.

3. A receiving element according to claim 1, wherein said cylindrical end section of said tip is joined in said recess to said bolt by at least one of an adhesive joint, shrink fit, press fit or clamp connection.

4. A receiving element according to claim 1, wherein an exterior surface of said transition area of said tip has a transition takeout angle that is substantially greater than a substantially conical takeout angle of said forward section of said tip.

5. A receiving element according to claim 1, wherein said exterior diameter of said bolt is between 3 to 12 mm.

6. A receiving element according to claim 1, wherein said exterior diameter of said bolt is between 3.5 to 10 mm.

7. A receiving element according to claim 1, wherein said exterior diameter of said bolt is between range is 4 to 8.5 mm 8. A receiving element according to claim 1, wherein said bolt includes a fastening body that is an integral component of said bolt and that comprises the same material as said bolt, said fastening body being disposed at an end of said bolt opposite said terminal end surface of said forward terminal end of said bolt.

9. A receiving element according to claim 8, wherein said fastening body includes a flange having an external flange diameter which is larger than said external diameter of said bolt.

10. A receiving body according to claim 1, further comprising a fastening body comprised of an electrically insulating material that is connected to said bolt at an end thereof opposite said forward terminal end of said bolt.

11. A receiving element according to claim 10, wherein:
said bolt includes a second recess; and
said fastening body includes a connecting section that engages in said second recess.

12. A receiving element according to claim 10, wherein said connecting section is joined directly to said bolt by means of at least one of an adhesive joint, a shrink fit, a press fit or a clamp connection.

13. A receiving element according to claim 10, wherein said fastening body includes a flange having an external flange diameter which is larger than said external diameter of said bolt.

14. A receiving element according to claim 13, wherein:
said bolt includes a second recess; and
said fastening body includes a connecting section that engages in said second recess.

15. A receiving element according to claim 14, wherein said connecting section is joined directly to said bolt by means of at least one of an adhesive joint, a shrink fit, a press fit or a clamp connection.

16. A receiving element according to claim 1, wherein said wear-resistant sintered materials comprise oxide ceramics or non-oxide ceramics.

17. A receiving element according to claim 16, wherein said ceramics include $Al_2O_3$, $ZrO_2$, or $Si_3N_4$, or mixtures thereof.

18. A receiving element according to claim 1, wherein said portion of the entire length of said bolt comprises less than 50% of said entire length.

19. A receiving element according to claim 1, wherein said portion of the entire length of said bolt comprises less than 30% of said entire length.

20. A receiving element according to claim 1, wherein said receiving element is configured for use in welding equipment.

21. A receiving element according to claim 20, wherein said welding equipment includes a pressure welding tool.

22. A receiving element according to claim 1, wherein said tip comprises at least a first and a second tapered portion.

23. A receiving element according to claim 22, wherein said first tapered portion extends from said plane containing said contact surface of said tip that contacts said terminal end surface of said forward terminal end of said bolt to said transition area transition point.

24. A receiving element according to claim 23, wherein said second tapered portion extends from said transition area transition point to said terminal end of said forward section of said tip.

* * * * *